(12) United States Patent
Kuhny et al.

(10) Patent No.: US 7,043,981 B2
(45) Date of Patent: May 16, 2006

(54) DEVICE FOR DETERMINING AND/OR MONITORING A PREDETERMINED LEVEL IN A CONTAINER

(75) Inventors: Jutta Kuhny, Lörrach (DE); Sergej Lopatin, Lörrach (DE); Volker Dreyer, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 96 days.

(21) Appl. No.: 10/220,274

(22) PCT Filed: Mar. 1, 2001

(86) PCT No.: PCT/EP01/02299

§ 371 (c)(1),
(2), (4) Date: Dec. 10, 2002

(87) PCT Pub. No.: WO01/66269

PCT Pub. Date: Sep. 13, 2001

(65) Prior Publication Data

US 2004/0056612 A1    Mar. 25, 2004

Related U.S. Application Data

(60) Provisional application No. 60/197,546, filed on Apr. 17, 2000.

(30) Foreign Application Priority Data

Mar. 8, 2000 (EP) ................................. 00104945

(51) Int. Cl.
*G01F 23/00* (2006.01)

(52) U.S. Cl. .................................................. 73/290 V
(58) Field of Classification Search .............. 73/290 V, 73/290 R
See application file for complete search history.

(56) References Cited

U.S. PATENT DOCUMENTS 3,495,102 A    2/1970   List et al.

(Continued)

FOREIGN PATENT DOCUMENTS

DE           4118793 A1    12/1992

(Continued)

*Primary Examiner*—Hezron Williams
*Assistant Examiner*—Rodney Frank
(74) *Attorney, Agent, or Firm*—Bacon & Thomas

(57) ABSTRACT

Disclosed is a device for determining and/or monitoring a predetermined level. The multipurpose inventive device comprises the following: a mechanical oscillating structure which is placed at the same height as the predetermined level, a pot-shaped housing which is sealed on one end by a membrane (3), piezo-electric elements (15,17) which are arranged in a pile (13) and which, when in operation, are used to place the oscillating structure in an oscillating state, in addition to detecting oscillations according to a momentary level and to make said oscillations accessible for further processing and/or evaluation, being confined between a first and second die (19,21) whose respective ends are adjacent to the pile (13), wherein the pile (13) is clamped along the longitudinal axis of the housing (1) between a pressure screw (24) which is screwed into the housing (1) and the membrane (3).

11 Claims, 5 Drawing Sheets

U.S. PATENT DOCUMENTS

| | | | |
|---|---|---|---|
| 3,625,058 A * | 12/1971 | Dress et al. | 73/290 V |
| 4,072,871 A | 2/1978 | Wilson | |
| 4,594,584 A * | 6/1986 | Pfeiffer et al. | 340/620 |
| 5,191,316 A * | 3/1993 | Dreyer | 340/621 |
| 5,408,168 A * | 4/1995 | Pfandler | 318/642 |
| 5,625,343 A * | 4/1997 | Rottmar | 340/620 |
| 5,631,633 A * | 5/1997 | Dreyer et al. | 340/621 |
| 5,709,558 A * | 1/1998 | Dreyer et al. | 439/95 |
| 5,717,383 A * | 2/1998 | Dreyer et al. | 340/621 |
| 5,743,134 A * | 4/1998 | Dreyer | 73/290 V |
| 5,895,848 A * | 4/1999 | Wilson et al. | 73/290 V |
| 5,969,621 A * | 10/1999 | Getman et al. | 340/621 |
| 6,389,891 B1 * | 5/2002 | D'Angelico et al. | 73/290 V |

FOREIGN PATENT DOCUMENTS

DE 19814669 A1 10/1999

* cited by examiner

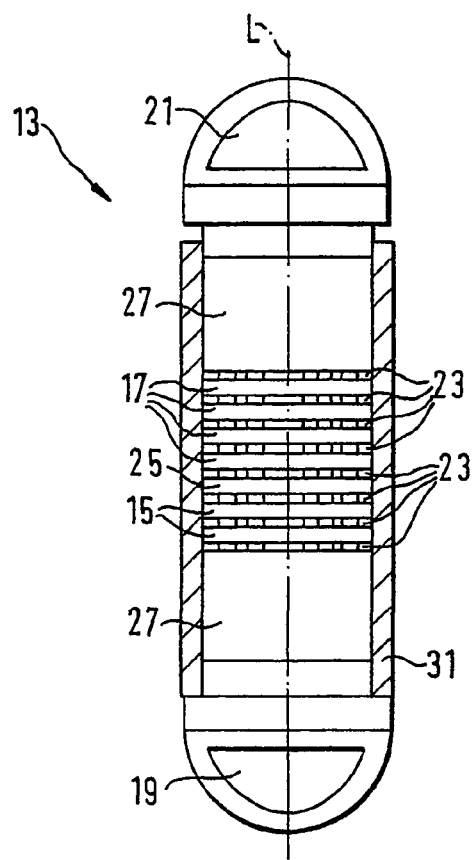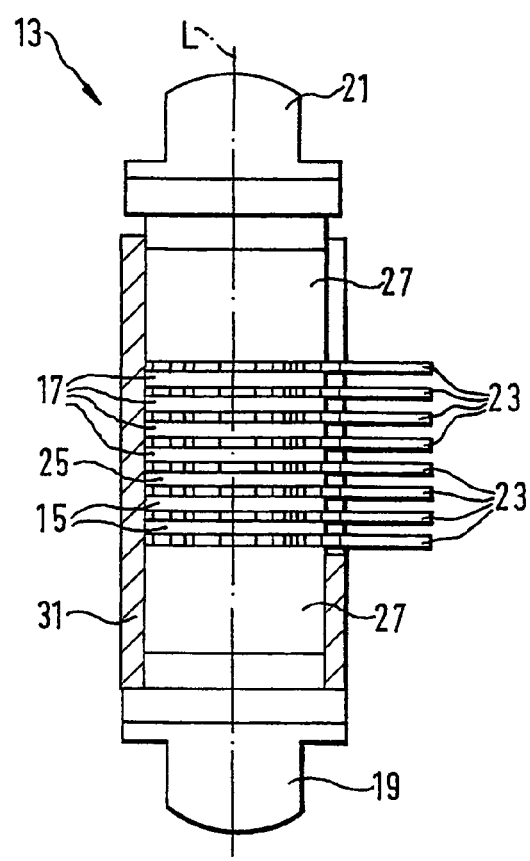
Fig. 5　　　Fig. 6
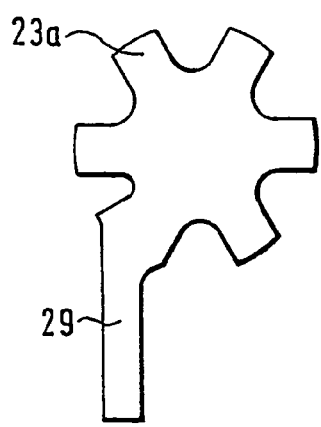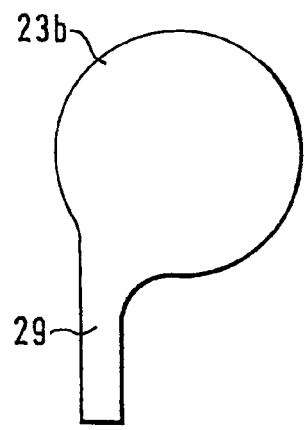
Fig. 7　　　Fig. 8

DEVICE FOR DETERMINING AND/OR MONITORING A PREDETERMINED LEVEL IN A CONTAINER

This application is a 371 of PCT/EP01/02299 filed Mar. 1, 2001, which claims the benefit of Provisional Application No. 60/197,546 filed Apr. 17, 2000.

FIELD OF THE INVENTION

The invention relates to a device for determining and/or monitoring a predetermined level in a container, which has a mechanical oscillating structure, mounted at the height of the predetermined level, with a housing sealed at the end by a diaphragm, which housing is excited to oscillations by an electromechanical transducer. The oscillations of the mechanical oscillating structure are picked up and converted into electrical signals, which are made accessible to further processing and/or evaluation. From the electrical signals, a frequency and/or an amplitude of the oscillation can for instance be determined. The frequency and/or amplitude provide information as to whether the mechanical oscillating structure is or is not covered by a product.

BACKGROUND OF THE INVENTION

Such level limit switches are used in many branches of industry, especially in chemistry and in the food industry. They serve the purpose of limit state detection and are used for instance to secure against overfilling or to prevent pumps from running empty.

Depending on the application, special demands are made of these devices. For instances, if the predetermined level is very far away from a mounting opening for a suitable measuring instrument, then an extension, hereinafter called a tube extension, of the housing is provided, by which the mechanical oscillating structure can be placed at the site of the predetermined level and through which the electrical connection of the electromechanical transducer is accomplished.

In some applications, it is preferable to apply a coating to the device, for instance with enamel or a plastic such as polyfluoramide (PFA) or Halar (ECTFE). Naturally, the device must be capable of withstanding the very high temperatures that can occur when the coating is applied.

Applications also exist in which very high temperatures and/or pressures can act on the device.

In German Patent Disclosure DE-A 41 18 793, a device for determining and/or monitoring a predetermined level in a container is described, which device includes:

a mechanical oscillating structure to be mounted at the height of the predetermined level;

having a pot-shaped housing sealed on one end by a diaphragm, and piezoelectric elements disposed in a stack, which in operation serve to cause the mechanical oscillating structure to oscillate and to receive its oscillations that are dependent on an instantaneous level and make it accessible to further processing and/or evaluation.

The transducer has piezoelectric elements in the form of annular disks, arranged in a stack. One metal ring is disposed on each of the two ends of the stack. The metal ring toward the diaphragm rests on an annular shoulder, which is formed onto an outer annular surface of the diaphragm pointing into the housing. A clamping screw pointing to the interior of the housing is provided in the middle of the diaphragm. This screw is provided with an insulation and extends through the transducer. A nut is screwed onto the end of the clamping screw facing away from the diaphragm. This nut rests on the metal ring facing away from the diaphragm. The nut is tightened. The diaphragm is thus prestressed.

SUMMARY OF THE INVENTION

It is an object of the invention to disclose a device for determining and/or monitoring a predetermined level in a container that is as versatile as possible in its uses.

To that end, the invention comprises a device for determining and/or monitoring a predetermined level in a container, which device includes:

a mechanical oscillating structure to be mounted at the height of the predetermined level;

having a pot-shaped housing sealed on one end by a diaphragm, piezoelectric elements disposed in a stack, which in operation serve to cause the mechanical oscillating structure to oscillate and to receive its oscillations that are dependent on an instantaneous level and make it accessible to further processing and/or evaluation; and which are enclosed between a first and a second die, each die adjacent on the end to the stack, and in which the stack is fastened along a longitudinal axis of the housing between a pressure screw, screwed into the housing, and the diaphragm.

In one feature, at least one piezoelectric element acts as an emitter, to which an electrical emission signal is applied in operation and which excites the oscillating structure to mechanical oscillations; and at least one piezoelectric element acts as a receiver, which in operation receives the mechanical oscillations of the oscillating structure and converts them into electrical signals.

In a refinement, a separator disk is disposed between the emitter and the receiver.

In one feature, the piezoelectric elements are disposed in a sheath, which is closed off on the ends by the first and second dies.

In a further feature, the stack is disposed in an insert in the housing.

In one feature, the pressure screw is connected to the insert by means of a snap closure.

In one feature, the pressure screw has a recess, through which connection lines of the piezoelectric elements are extended.

In a refinement, the stack, insert and pressure screw form a unit, which can be screwed into the housing by means of a tool engaging the pressure screw.

In a refinement, the diaphragm has a depression, which is made to conform to the shape of the first die and in which the first die is rotatably supported.

One advantage of the invention is that the transmission of force from the piezoelectric elements disposed in the stack is effected directly to the diaphragm. This makes it possible to excite and pick up oscillations with little loss and with accurate phase relationships.

In addition, the disklike piezoelectric elements used here have the advantage over the annular-disk-shaped piezoelectric elements described in the aforementioned prior art that for the same force generation, piezoelectric elements with a smaller outer diameter can be used.

The invention and other advantages will now be described in further detail in conjunction with the drawing figures, in which one exemplary embodiment is shown; identical elements are provided with the same reference numerals in the drawings.

BRIEF DESCRIPTION OF THE DRAWINGS

FIG. 5 is a longitudinal section through a stack of piezoelectric elements that is fastened between dies adjoining them at the ends;

FIG. 6 shows a further longitudinal section through a stack of piezoelectric elements which is fastened between dies adjoining them on the ends, the sectional plane being rotated 90° from the sectional plane of the longitudinal section shown in FIG. 5;

FIG. 7 shows a star-shaped electrode;

FIG. 8 shows an electrode in the form of a circular disk;

DESCRIPTION OF THE PREFERRED EMBODIMENT

Figures 1, 2:
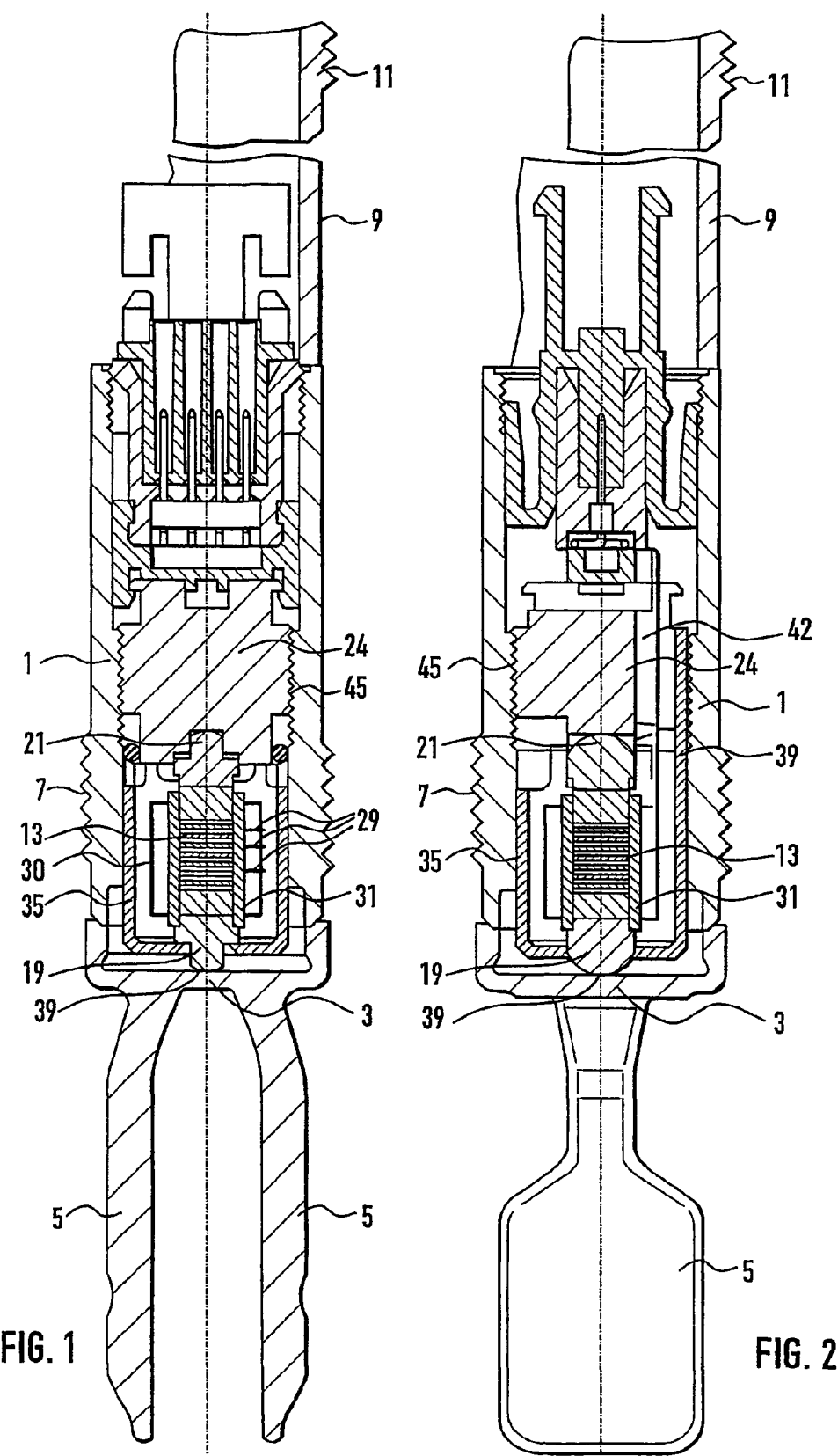
FIG. 1 shows a longitudinal section through a device of the invention.
FIG. 2 shows a further longitudinal section through the device, with the sectional plane rotated 90° from the sectional plane of the longitudinal section shown in FIG. 1.

FIGS. 1 and 2 each show a longitudinal section through a device according to the present invention for determining and/or monitoring a predetermined level in a container. The sectional plane chosen in FIG. 1 is rotated by 90° from the sectional plane shown in FIG. 2.

The device has an essentially cylindrical housing 1, which is closed off flush at the front on the end by a circular-disk-shaped diaphragm 3. On the outside of the housing 1, two oscillator bars 5 pointing into the container are formed onto the diaphragm 3. The housing 1, diaphragm 3 and oscillator bars 5 are components of a mechanical oscillating structure, which is set into oscillations by an electromechanical transducer disposed in the interior of the housing 1. The diaphragm 3 executes bending oscillations, and the oscillator bars 5 are set into oscillations perpendicular to their longitudinal axis.

However, the invention is not limited to mechanical oscillating structures with two oscillator bars; it can also be used in limit switches that have only one oscillator bar or no oscillator bars. In this last case, for instance, only the oscillating diaphragm comes into contact with a product in the container.

The device should be mounted at the height of a predetermined level. To that end, as shown for instance on the left-hand side of FIGS. 1 and 2, a male thread 7 is provided on the housing 1, by means of which the device can be screwed into a suitable opening in a container. Other types of fastening, for instance by means of flanges can also be used. For the case where the predetermined level is at some distance from a mounting device for measuring instruments, a tube extension 9, shown in the right-hand half of FIGS. 1 and 2, should for instance be provided. An application that occurs especially often and in which this is the case is the use of the device to protect a pump from running empty. In this case, the predetermined level is a minimal fill level that must remain in a container, to protect the pump. Thus the predetermined level is typically in the vicinity of the container body. Devices for securing measuring instruments, however, are as a rule provided on the container cap. The tube extension 9 should be secured for instance by means of a male thread 11 formed onto the end of the tube extension. Other types of fastening, such as by means of flanges, can also be used.

As the electromechanical transducer, piezoelectric elements 15, 17 disposed in a stack 13 are provided, which in operation serve to set the mechanical oscillating structure into oscillations and to pick up its oscillations, which are dependent on an instantaneous fill level, and make them accessible to further processing and/or evaluation.

The piezoelectric elements 15, 17 are fastened between a first and a second die 19, 21, the dies each adjoining the stack on the ends. FIGS. 5 and 6 show the stack 13 and the first and second dies 19, 21 in detail. The first and second dies 19, 21 preferably comprise a very hard material, such as a metal.

The stack 13 is fastened along a longitudinal axis of the housing 1 between a pressure screw 24, screwed into the housing 1, and the diaphragm 3. As a result, the diaphragm 3 is prestressed. Because of the direct exertion of force from the stack 13 onto the diaphragm 3 and the rigid fastening assured by the pressure screw 24, it is possible to establish a relatively high prestressing of the diaphragm 3 by means of the pressure screw 24. This offers the advantage that the device can be used even at high temperatures, such as markedly above 100° C., and at high pressures, such as markedly above 60 bar, since the frequency and/or amplitude of the oscillations of the mechanical oscillating structure, when the diaphragm 3 is highly prestressed, are less strongly affected by a pressure acting on the oscillating structure and/or by different thermal expansions of various elements of the device in response to temperature changes.

At least one piezoelectric element 15 acts a s an emitter, and at least one piezoelectric 17 acts as a receiver. The emitters and the receivers each have two electrodes 23. These electrodes are disposed on faces that face one another on the piezoelectric elements 15, 17. One electrode 23 of each emitter is connected to a reference potential such as ground. The respective other electrode 23 of the emitter is connected to a respective emission signal line. Analogously, one electrode 23 of each receiver is connected to a reference potential, such as ground. The respective other electrode 23 of the receiver is connected to a respective reception signal line. To that end, in operation, the receiver serves to pick up the mechanical oscillations of the oscillating structure and convert them into electrical signals.

All the piezoelectric elements 15, 17, that is, the emitters and receivers, are polarized respectively parallel and antiparallel to the longitudinal axis L of the stack 13. To that end, in operation, the emitter serves to excite the mechanical oscillating structure to mechanical oscillations. For that purpose, an electrical emission signal is applied to the emitter in operation, by means of which signal the emitter and thus the stack 13 is excited to execute thickness oscillations.

Correspondingly, an oscillation of the oscillator bars 5 causes a bending oscillation of the diaphragm 3, which in turn causes a thickness oscillation of the stack 13. This thickness oscillation causes a change in the voltages dropping across the receivers. A corresponding reception signal is available via the respective reception signal line.

The amplitude of these reception signals are greater the higher the mechanical oscillation amplitude of the mechanical oscillating structure. Utilizing this fact, the arrangement is preferably operated at its resonant frequency $f_r$. At the resonant frequency $f_r$, the mechanical oscillation amplitude is maximal.

In order that the mechanical oscillating structure will be set into oscillations at its resonant frequency $f_r$, a closed-loop control circuit can for instance be provided, which regulates an existing phase difference between the emission signal and the reception signal to a defined constant value $Delta\phi_R$, for instance by feeding a reception signal back to the emission signal via a phase shifter and an amplifier. A closed-loop control circuit of this kind is described for instance in German Patent Disclosure DE-A 44 19 617.

The resultant resonant frequency $f_r$ and its amplitude depend on whether the mechanical oscillating structure is covered by the product in the container, or not. Correspondingly, one measured variable or both can also be used to determine and/or monitor the predetermined level.

For instance, the reception signal can be delivered to an evaluation unit, which by means of a frequency measuring circuit determines its frequency and delivers the result to a comparator. The comparator compares the measured frequency to a reference frequency $f_R$ stored in a memory. If the measured frequency is less than the reference frequency $f_R$, the evaluation circuit outputs an output signal that indicates that the mechanical oscillating structure is covered by a product. If the frequency has a value greater than the reference frequency $f_R$, then the evaluation unit outputs an output signal that indicates that the mechanical oscillating structure is not covered by the product.

The output signal is for instance a voltage, which assumes a corresponding value, or a current which has a corresponding value or on which a signal current, in the form of pulses of a corresponding frequency or duration, is superimposed.

The consequence of a thickness oscillation of an emitter is always a transverse contraction of the corresponding piezoelectric element 17. This transverse contraction has only a slight effect on the oscillation of the mechanical oscillating structure, but because of a mechanical coupling between the emitter and the receiver, it can cause a deformation of a piezoelectric element 15 acting as a receiver. Such a deformation would cause a change in the reception signal that is independent of the oscillation behavior of the oscillating structure and thus also of the fill level, and could hence lead to incorrect measurements.

In the device of the invention, on a side toward the diaphragm, two piezoelectric elements 15 are used as receivers; they can either be evaluated jointly, for instance if the piezoelectric elements 15 have the same polarization they can be evaluated in the form of a total signal of the two received signals, or they can be evaluated individually. Four piezoelectric elements 17 acting as emitters are connected electrically parallel and mechanically in series in the side remote from the diaphragm. For mechanical decoupling, a separator disk 25 is disposed between the emitters and the receivers. This separator disk 25 for instance comprises ceramic and preferably has a shape made to conform to the piezoelectric elements 15, 17. The thickness of the separator disk 25 is preferably determined as a function of the magnitude of a mechanical coupling between the emitter and the receiver that exists without the separator disk 25.

In the exemplary embodiment shown, four emitters and four receivers are provided, to achieve the highest possible transmission power. In applications in which this is not needed, a symmetrically constructed stack, for instance with two emitters disposed next to one another and two receivers disposed next to one another, can be provided. In that arrangement, a separator disk is preferably provided between the emitters and the receivers. This arrangement of the piezoelectric elements offers the advantage that the stack is symmetrical; that is, in installation, there is no need to pay attention to which end of the stack is toward the diaphragm 3.

Alternatively, an arrangement of the piezoelectric elements oriented to safety can also be made. For instance, two emitters disposed spatially separately from one another and preferably connected electrically separately can be provided. This redundance offers the advantage that even if one emitter fails, an excitation of oscillation will still occur. Analogously, in this kind of safety-oriented arrangement, preferably two receivers electrically connected independently of one another are provided, whose received signals are preferably evaluated separately. Once again, the resultant redundance attained offers enhanced safety. Also, preferably wherever an emitter is next to a receiver, a separator disk is preferably provided between the emitter and the receiver.

The piezoelectric elements 15, 17 are placed on one another, with the interposition of the electrodes 23, and an insulator disk 27, for instance of ceramic, adjoins whichever is the outer electrode 23 on the end.

In FIG. 7, a first exemplary embodiment of an electrode 23a is, and FIG. 8 shows a second exemplary embodiment of an electrode 23b. The electrode 23a has fingers extending in star-like fashion, with open spaces between them. This form of an electrode should be used especially preferably whenever the two elements adjacent to it are supposed to be glued to the electrode 23a and to one another. This is the case for instance whenever two adjacent piezoelectric elements 15, 17 can be addressed via one electrode 23a. The open spaces between the fingers take up excess glue in the gluing operation and prevent the glue from escaping from the interstice onto the jacket faces of the components connected to the electrode. Adhesive on these jacket faces could cause parasitic electrical connections and thus erroneous signals.

The electrode 23b shown in FIG. 8, conversely, utilizes the entire surface area available and thus offers a larger and more-uniform contact face.

The electrodes 23a, 23b each have a small lug 29, formed onto it, by way of which the electrodes 23, 23a, 23b can be connected electrically.

Figure 9:
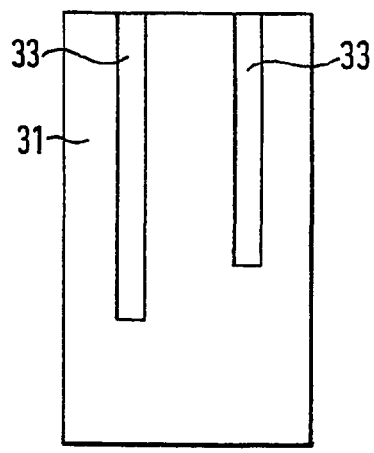
FIG. 9 is an elevation view of the sheath of FIG. 1.
Figure 10:
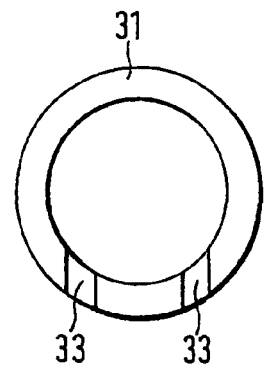
FIG. 10 is a plan view on the sheath of FIG. 1.

The stacked piezoelectric elements 15, 17 and the insulating body adjoining them on the ends are disposed in a sheath 31, shown in detail in FIGS. 9 and 10. The sheath 31 is cylindrical and has two slits 33, through which the lugs 29 can be passed. The lugs 29 extend parallel, offset from a diagonal of the electrodes 23, 23a, 23b. This offers the advantage that depending on which face of the electrode 23, 23a, 23b the diaphragm 3 is oriented toward, the lug 29 protrudes from either the right-hand or the left-hand slit 33. In this way, the individual electrodes 23 can be associated with a given slit. Thus a plurality of electrodes 23 to be connected identically can be more easily put together.

Figure 3:
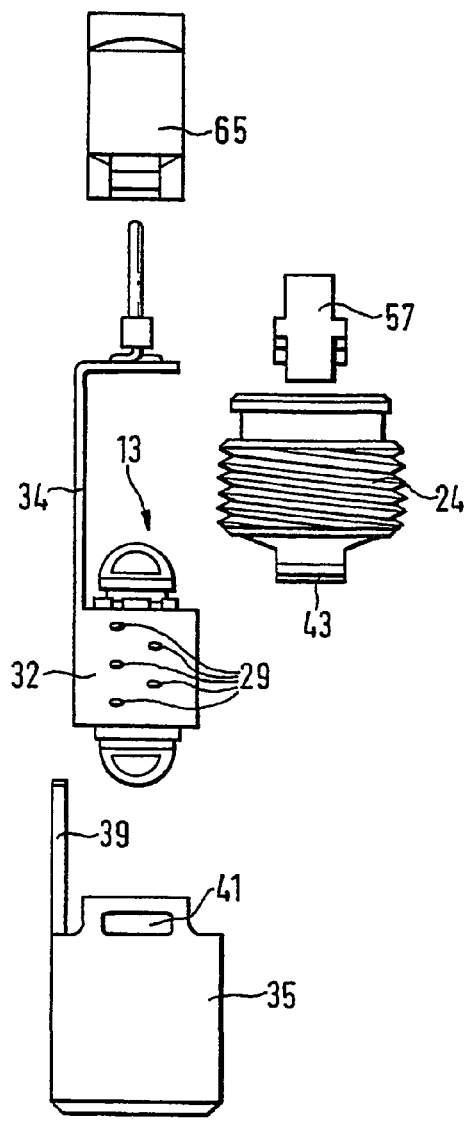
FIG. 3 is an exploded view of the components disposed in the housing of the exemplary embodiment shown in FIGS. 1 and 2.
Figure 4:
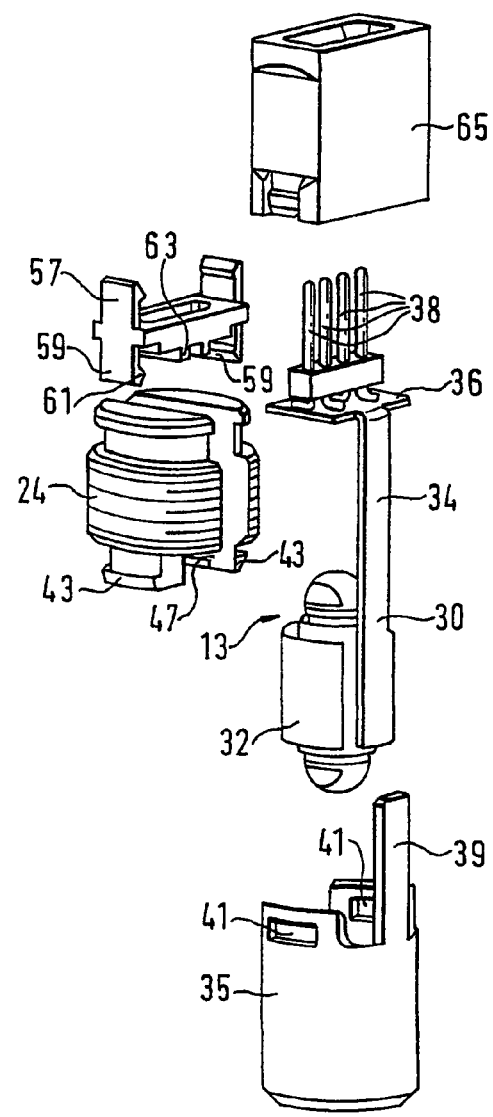
FIG. 4 is an exploded view of the components shown in FIG. 3, from a different angle.

The lugs 29 are connected to a flexible printed circuit board 30, which has a rectangular portion 32 that, as shown in FIGS. 3 and 4, surrounds the stack 13. This portion is adjoined by a further portion 34, which extends parallel to the longitudinal axis of the stack 13 in the direction remote from the diaphragm. A region 36 is formed onto the end of this portion 34, and in this region the connection lines of the piezoelectric elements 15, 17 are connected at the ends to connection pins 38.

The sheath 31 is closed off at the end by the first and second dies 19, 21. The dies 19, 21 have a cylindrical portion that protrudes into the sheath 31.

Figure 11:
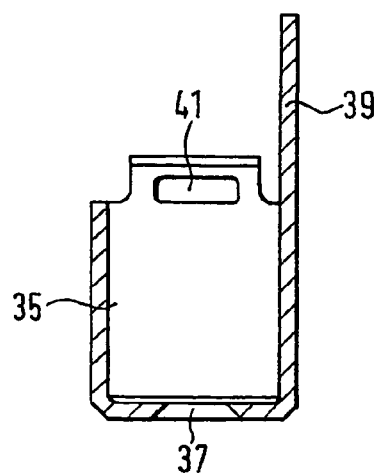
FIG. 11 is a sectional view of the insert of FIG. 1.
Figure 12:
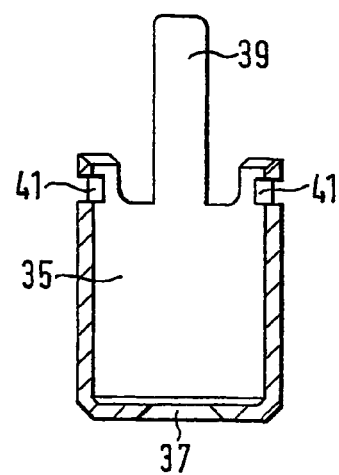
FIG. 12 is a sectional view of the insert of FIG. 1.
Figure 13:
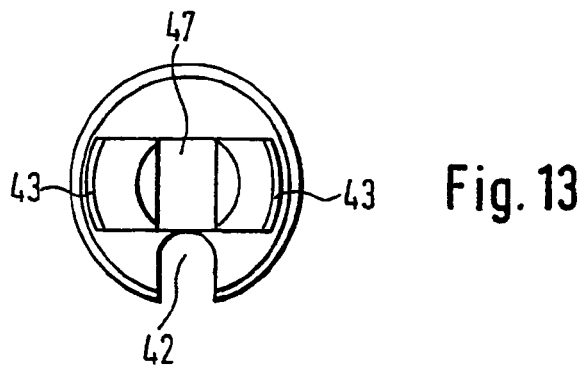
FIG. 13 is a plan view on an end face, toward the diaphragm, of the pressure screw.
Figure 14:
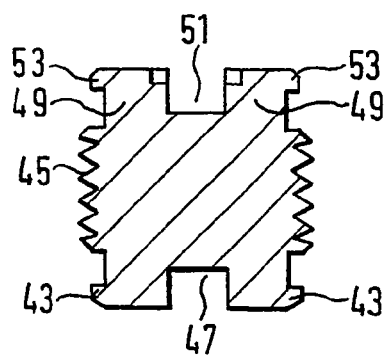
FIG. 14 is a longitudinal section through the pressure screw.
Figure 15:
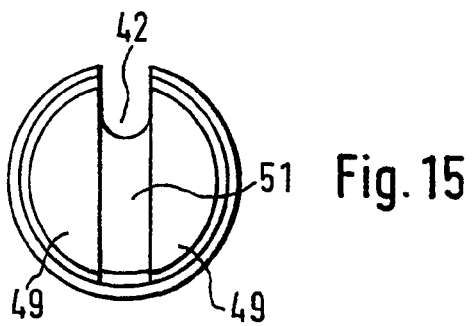
FIG. 15 is a plan view on an end face, remote from the diaphragm, of the pressure screw.
Figure 16:
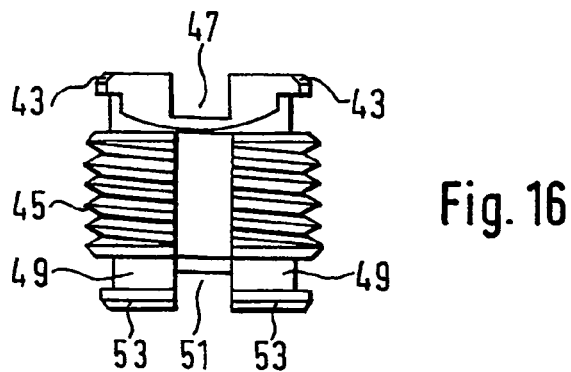
FIG. 16 is an elevation view of the pressure screw.

The stack 13 is disposed in an insert 35 in the housing 1. The insert 35 is shown in detail in FIGS. 11 and 12. It is essentially pot-shaped and has a bottom in whose middle a continuous opening 37 is provided. The shape of the opening 39 is made to conform to that of the die 19. In the exemplary embodiment shown, the die 19 has a round dome of rectangular cross section. Correspondingly, the opening 37 is also rectangular, so that the die 19 is fixed in its position relative to the insert 35. The diaphragm 3 preferably has a depression made to conform to the shape of the first die 19, in which depression the round dome of the die 19 is rotatably supported. This form of support offers the advantage that because of the round shape of the dome and of the depression, a rotation without major friction losses and without torsional forces that act on the stack 13 is readily possible, yet nevertheless, because of the large bearing surface of the dome in the depression, a very good mechanical transmission of force from the stack 13 to the diaphragm 3 is simultaneously assured.

The insert 35 has a narrow wall portion 39, extending away in the direction remote from the diaphragm, which acts as a backrest for the portion 34 of the flexible printed circuit board 30.

The pressure screw 24 is connected to the insert 35 by means of a snap closure. To that end, the insert 35 has two recesses 41, opposite one another on its end remote from the diaphragm, and correspondingly shaped detent lugs 43 provided on an end toward the diaphragm of the pressure screw 24 snap into these recesses. The snap closure offers the advantage that the insert 35 and pressure screw 24 are joined together in a very simple way.

The pressure screw 24 has a laterally open recess 42, through which connection lines of the piezoelectric elements 15, 17 are passed. The connection lines extend in the flexible printed circuit board 30. The lateral opening of the recess 42 is covered by the wall portion 39.

The pressure screw 24 is shown in detail in FIGS. 13–16, and its installation can be seen from FIGS. 3 and 4. It has essentially three portions. A middle portion is essentially in the form of a circular disk and has a male thread 45 with which the pressure screw 24 is screwed into the housing 1. The middle portion is adjoined by a portion toward the diaphragm, which has an essentially rectangular cross section and on whose outer ends the detent lugs 43 are formed. This portion has a recess 47, shown in FIGS. 4, 13, 14 and 16, which is engaged by the second die 21. The die 21 has a round dome of rectangular cross section. Correspondingly, the recess 47 is also rectangular, so that the die 21 is fixed in its position relative to the pressure screw 24.

The pressure screw 24 also has a portion remote from the diaphragm, which has two opposed, identically shaped regions 49 of circular-segmental cross section, which are separated from one another by a recess 51. The circular-segmental cross sections define a circle, and the recess 51 extends parallel to a diagonal of this circle. Onto the outside of each of the two regions 49, a radially outward-extending shoulder 53 is formed on, extending all the way around.

A narrow carrier 57 of rectangular cross section is snapped onto the shoulders 53. To that end, the carrier 57 has two portions 59, formed on opposite one another and extending in the direction toward the diaphragm, onto which portions radially inward-pointing extensions 61 are formed. On being snapped on, the extensions 61 engage the shoulders 53 of the pressure screw 24 from behind. In addition, the carrier 57 has a guide rail 63, which engages the recess 51 of the pressure screw 24 and prevents rotation of the carrier 57 relative to the pressure screw 24.

The region 36 of the flexible printed circuit board 30 that has the connection pins 38 rests on the carrier 57. A connection plug 65 is snapped onto the carrier 57 and the connection pins 38. The connection plug 65 likewise has a narrow rectangular cross section.

Upon assembly of the device of the invention, first the stack 13 is formed, and the piezoelectric elements 15, 17 are connected to the connection lines in the flexible printed circuit board 30 via the lugs 29. Next, the stack 13 is inserted into the insert 35, and the pressure screw 24 is snapped on. The carrier 57 is mounted on the pressure screw 24, and the plug connector 65 is slipped onto the carrier 57 and the connection pins 38.

The stack 13, insert 35 and pressure screw 24 thus form a unit. In particular, this means that the individual components are not rotatable relative to one another. This unit can be screwed into the housing 1 by means of a tool that engages the pressure screw 24. For instance, a tool in the form of a two-tined fork can be used, whose tines engage the regions of the recess 51 that are freely accessible from a side of the device remote from the diaphragm, on both sides of the carrier 57 and the plug connector 65.

This unit can also be mounted through a tube extension 9 of considerable length, for instance several meters long. This offers the great advantage that the mechanical oscillating structure can be joined, for instance welded, to the tube extension 9 and can then subsequently be provided with a coating, in the form of enameling or a plastic coating, and only after that is the unit inserted. This offers the advantage that even in applications that require a tube extension, coatings for the device whose application can involve very high temperatures, for instance several hundred degrees Celsius, can still be provided even though the electromechanical transducer itself and its connection lines are unable to withstand such temperatures.

The invention claimed is:

1. A device for determining and/or monitoring a predetermined level in a container, comprising:
    a mechanical oscillating structure mounted at the height of the predetermined level;
    a pot-shaped housing sealed at one end with a diaphragm and defining a longitudinal axis;
    a plurality of piezoelectric elements disposed in a stack;
    a first and second die, each die being located at one end adjacent to said stack; and
    a pressure screw screwed into said housing, wherein:
    said stack is fastened along the longitudinal axis defined by said housing between said pressure screw and said diaphragm; and
    said plurality of piezoelectric elements serving to cause said mechanical oscillating structure to oscillate and to receive its oscillations, that are dependent on an instantaneous level, and make it accessible to further processing and/or evaluation; and
    a sheath closed off at its ends by said first and second dies, wherein:
    said piezoelectric elements are disposed in said sheath.

2. The device as defined in claim 1, wherein:
    at least one piezoelectric element of said plurality of piezoelectric elements acts as an emitter, to which an electrical emission signal is applied in operation and which excites said oscillation structure to mechanical oscillations; and at least one piezoelectric element of said plurality of piezoelectric elements acts as a receiver, which is operation receives the mechanical oscillations of said oscillating structure and converts them into electrical signals.

3. The device as defined in claim 2, wherein at least one piezoelectric element of said plurality of piezoelectric elements serves as a separator disk disposed between said emitter and said receiver.

4. The device as defined in claim 1, wherein:
said housing has an insert; and
said stack is disposed in said insert.

5. The device as defined in claim 4, wherein:
said pressure screw is connected to said insert by a snap closure.

6. The device as defined in claim 1, wherein:
said pressure screw defines a recess through which connection lines of said piezoelectric elements extend.

7. The device as defined in claim 1, wherein:
said stack, said insert and said pressure screw form a unit which can be screwed into said housing by means of a tool engaging said pressure screw.

8. The device as defined in claim 1, wherein:
said diaphragm has a depression, made to conform to the shape of aid first die, and in which said first die is rotatably supported.

9. A device for determining and/or monitoring a predetermined level in a container, comprising:
a mechanical oscillating structure mounted at the height of the predetermined level;
a pot-shaped housing sealed at one end with a diaphragm and defining a longitudinal axis;
a plurality of piezoelectric elements disposed in a stack;
a first and second die, each die being located at one end adjacent to said stack; and
a pressure screw screwed into said housing, wherein:
said stack is fastened along the longitudinal axis defined by said housing between said pressure screw and said diaphragm; and
said plurality of piezoelectric elements serving to cause said mechanical oscillating structure to oscillate and to receive its oscillations, that are dependent on an instantaneous level, and make it accessible to further processing and/or evaluation, wherein:

said housing has an insert;
said stack is disposed in said insert; and
said pressure screw is connected to said insert by a snap closure.

10. A device for determining and/or monitoring a predetermined level in a container, comprising:
a mechanical oscillating structure mounted at the height of the predetermined level;
a pot-shaped housing sealed at one end with a diaphragm and defining a longitudinal axis;
a plurality of piezoelectric elements disposed in a stack;
a first and second die, each die being located at one end adjacent to said stack; and
a pressure screw screwed into said housing, wherein:
said stack is fastened along the longitudinal axis defined by said housing between said pressure screw and said diaphragm; and
said plurality of piezoelectric elements serving to cause said mechanical oscillating structure to oscillate and to receive its oscillations, that are dependent on an instantaneous level, and make it accessible to further processing and/or evaluation, wherein:
said pressure screw defines a recess though which connection lines of said piezoelectric elements extend.

11. A device for determining and/or monitoring a predetermined level in a container, comprising:
a mechanical oscillating structure mounted at the height of the predetermined level;
a pot-shaped housing sealed at one end with a diaphragm and defining a longitudinal axis;
a plurality of piezoelectric elements disposed in a stack;
a first and second die, each die being located at one end adjacent to said stack; and
a pressure screw screwed into said housing, wherein:
said stack is fastened along the longitudinal axis defined by said housing between said pressure screw and said diaphragm; and
said plurality of piezoelectric elements serving to cause said mechanical oscillating structure to oscillate and to receive its oscillations, that are dependent on an instantaneous level, and make it accessible to further processing and/or evaluation, wherein:
said stack, said insert and said pressure screw form a unit which can be screwed into said housing by means of a tool engaging said pressure screw.

* * * * *